(12) United States Patent
Pfau

(10) Patent No.: US 10,669,058 B2
(45) Date of Patent: Jun. 2, 2020

(54) WEIGHING AND LABELING CONVEYOR HAVING ALTERNATING PRINTER USE

(71) Applicant: Bizerba SE & Co. KG, Balingen (DE)

(72) Inventor: Helmut Pfau, Bodelshausen (DE)

(73) Assignee: Bizerba SE & Co. KG, Balingen (DE)

(*) Notice: Subject to any disclaimer, the term of this patent is extended or adjusted under 35 U.S.C. 154(b) by 0 days.

(21) Appl. No.: 15/728,514

(22) Filed: Oct. 10, 2017

(65) Prior Publication Data
US 2018/0141696 A1    May 24, 2018

(30) Foreign Application Priority Data

Nov. 21, 2016   (EP) .................................... 16199900

(51) Int. Cl.
| | |
|---|---|
| *B32B 41/00* | (2006.01) |
| *B65C 9/40* | (2006.01) |
| *B65C 1/02* | (2006.01) |
| *B32B 37/00* | (2006.01) |
| *B32B 39/00* | (2006.01) |
| *B65C 9/18* | (2006.01) |
| *B65C 9/26* | (2006.01) |

(Continued)

(52) U.S. Cl.
CPC ............ *B65C 9/40* (2013.01); *B32B 37/0046* (2013.01); *B32B 39/00* (2013.01); *B65C 1/02* (2013.01); *B65C 1/021* (2013.01); *B65C 9/18* (2013.01); *B65C 9/26* (2013.01); *G01G 11/003* (2013.01); *B65C 2009/408* (2013.01); *B65G 15/28* (2013.01)

(58) Field of Classification Search
CPC .. B65C 9/40; B65C 1/021; B65C 9/26; B65C 1/02; B65C 9/18; B32B 39/00; B32B 37/0046; G01G 11/003; B65G 15/28
USPC ........................... 156/64, 350, 351, 378, 379
See application file for complete search history.

(56) References Cited

U.S. PATENT DOCUMENTS

| | | | |
|---|---|---|---|
| 2004/0036908 A1* | 2/2004 | Yagita | ..................... G06F 3/121 358/1.15 |
| 2005/0067111 A1 | 3/2005 | Geurtsen | |

(Continued)

FOREIGN PATENT DOCUMENTS

| | | |
|---|---|---|
| DE | 202004009707 U1 | 8/2004 |
| EP | 2832651 A1 | 2/2015 |

*Primary Examiner* — Michael N Orlando
*Assistant Examiner* — Joshel Rivera
(74) *Attorney, Agent, or Firm* — Leydig, Voit & Mayer Ltd.

(57) ABSTRACT

In an embodiment, the present invention provides a weighing and labeling conveyor for labeling articles, the articles including a first application point at a same point on the article, the conveyor including: a weighing conveyor for determining the weight of the articles; a transport apparatus for transporting the articles; and a labeling system for labeling the articles, the labeling system including three labelers, each labeler including an applicator, each applicator being suitable for applying a label to the first application point on an article while the article is being transported on the transport apparatus. Of the three labelers, during normal operation two labelers are in an active operating state and one labeler is in a passive operating state. During normal operation, the two labelers that are in the active operating state alternately label the first application point of successive articles.

16 Claims, 3 Drawing Sheets

(51) Int. Cl.
*G01G 11/00* (2006.01)
*B65G 15/28* (2006.01)

(56) References Cited

U.S. PATENT DOCUMENTS

| | | | |
|---|---|---|---|
| 2010/0191978 A1* | 7/2010 | Pfau | G01G 23/017 713/189 |
| 2016/0052659 A1* | 2/2016 | Bowers | B65C 1/021 156/64 |

* cited by examiner

WEIGHING AND LABELING CONVEYOR HAVING ALTERNATING PRINTER USE

CROSS-REFERENCE TO PRIOR APPLICATION

Priority is claimed to European Patent Application No. 16 19 9900.8, filed on Nov. 21, 2016, the entire disclosure of which is hereby incorporated by reference herein.

FIELD

The present invention relates to a weighing and labeling conveyor having alternating printer use, and to a method for operating a weighing and labeling conveyor having alternating printer use.

BACKGROUND

Weighing and labeling conveyors, referred to as price labelers, for labeling articles comprise a weighing belt for determining a weight value of an article, one or more transport apparatuses, designed as conveyor belts, for transporting an article, a labeler comprising a printer for printing a label with information, in particular at least one item of information related to the weight value of the article, and comprising an applicator for applying the label to the corresponding article. The articles to be labeled are in particular food in trays, food packaged in plastics film, food packaged in boxes or cartons, or any products that are transported on the weighing and labeling conveyor in plastics, paper or cardboard packaging.

The throughput of articles through the weighing and labeling conveyor is often limited by the printing speed, i.e. by the time the printer requires in order to print a corresponding label for an article. For this reason, weighing and labeling conveyors that are intended to achieve a high throughput comprise two labelers and therefore two printers, the labelers each alternately printing and applying a label for articles in the stream of articles on the transport apparatus, such that, for example, the first labeler in the article sequence labels all the odd articles, and the second labeler in the article sequence labels all the even articles. In this case, both labelers apply their labels at the same point on the articles, for example on the top or on the bottom of the packaging.

The weighing and labeling conveyor is integrated in a production system. If a fault occurs in the weighing and labeling conveyor, for example because the label roll in the printer is empty and needs to be changed, the entire production system is therefore at a standstill until the label roll is changed by an operator, and thus until the fault in the printer is rectified.

SUMMARY

In an embodiment, the present invention provides a weighing and labeling conveyor for labeling articles, the articles comprising a first application point at a same point on the article, the conveyor comprising: a weighing conveyor configured to determine the weight of the articles; a transport apparatus configured to transport the articles; and a labeling system configured to label the articles, the labeling system comprising three labelers, each labeler comprising an applicator, each applicator being configured to apply a label to the first application point on an article while the article is being transported on the transport apparatus, wherein, of the three labelers, during normal operation two labelers are in an active operating state and one labeler is in a passive operating state, and wherein, during normal operation, the two labelers that are in the active operating state are configured to alternately label the first application point of successive articles.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
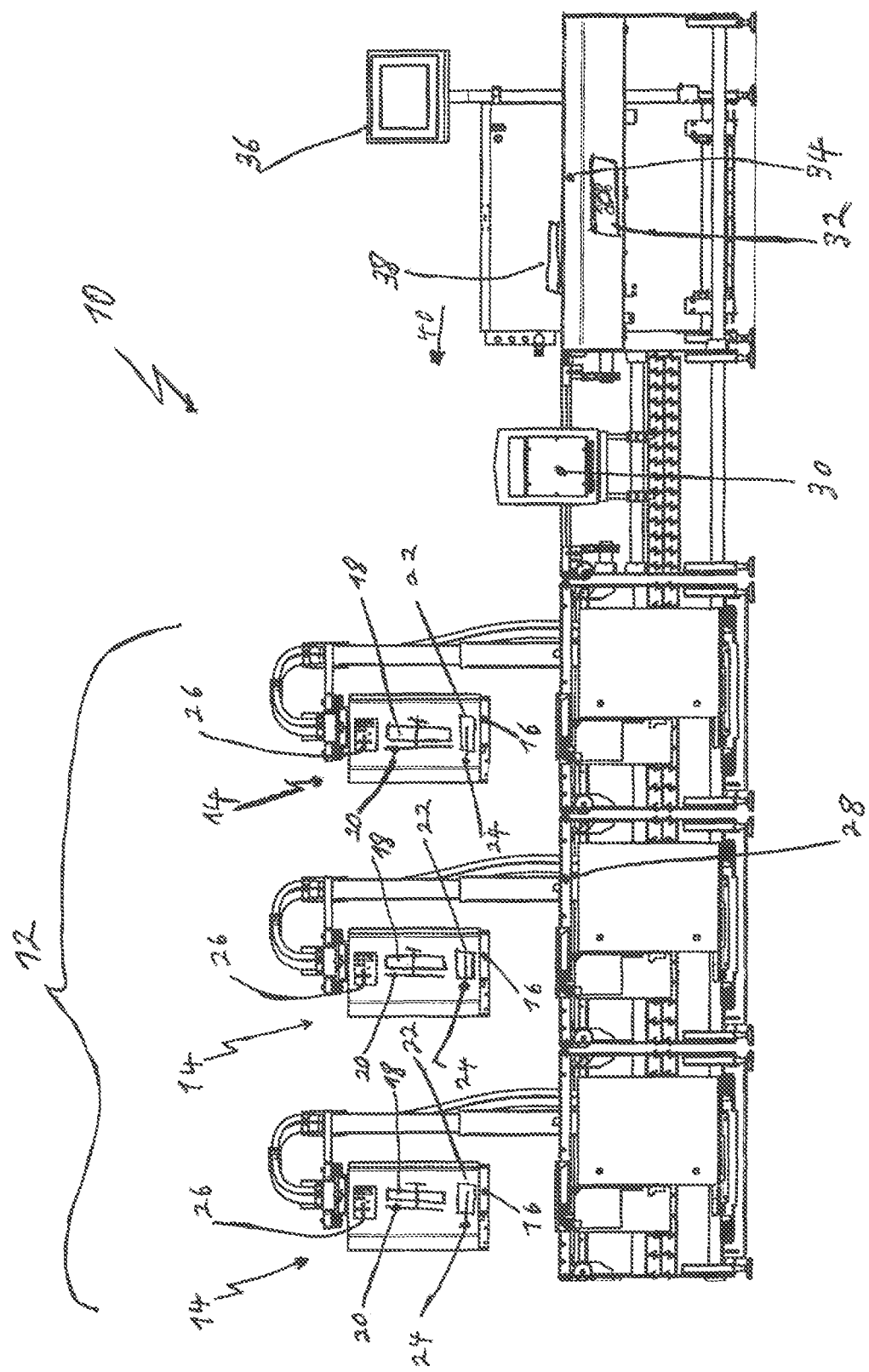
FIG. 1 shows a weighing and labeling conveyor according to the invention.

According to the invention, a weighing and labeling conveyor for labeling articles comprises a weighing conveyor for determining the weight of the articles. The weighing conveyor is also known to a person skilled in the art by the term conveyor belt scales. The weighing conveyor determines the weight of an article when said article is guided over the weighing apparatus by the conveyor. A transport apparatus consisting of one or more conveyors is provided for transporting the articles from the start of the weighing and labeling conveyor to the end of the weighing and labeling conveyor. The weighing and labeling conveyor comprises a labeling system for labeling the articles. The labeling system consists of three labelers. Each labeler comprises an applicator. Each applicator of a labeler is designed to be able to apply a label to a first application point on an article while the article is being transported on the transport apparatus, not every labeler of the labeling system actually applying a label to every article during operation. That is to say that each labeler is designed to apply a label to the same point on an article, referred to as the first application point. A person skilled in the art would interpret the "same point" such that minimal deviations resulting from the system tolerances are also considered to be the same point. During normal operation of the weighing and labeling conveyor, two labelers of the labeling system are in an active operating state and one labeler is in a passive operating state. The two labelers that are in the active operating state during normal operation alternately label successive articles on the transport apparatus, the label being applied to the first application point on the articles. That is to say that, for example, one labeler applies a label to the first application point of the first, third and fifth article and the other labeler applies a label to the second, fourth and sixth article of successive articles, a third labeler being provided that is likewise designed to apply a label to the first application point of the articles, said third labeler being in a passive operating state, i.e. in a standby operating state, and therefore not applying any labels to the articles. Said third labeler functions as a reserve labeler for the labelers that are currently in the active operating state. The weighing and labeling conveyor according to the invention is advantageous in that a high article throughput is achieved. The printing time for the labels is decisive for the article throughput. Using two labelers alternately makes it possible to increase the throughput. However, when one printer fails, for example because of a label roll being finished, the entire weighing and labeling conveyor system comes to a standstill. The labeling system according to the invention is designed such that a further printer is available in this case, and therefore the article throughput of the weighing and labeling conveyor is not reduced and the system does not come to a standstill.

In one embodiment, each labeler of the labeling system comprises a printer for printing the labels. Labels can also be pre-printed in part, so that only a portion of the labels remains to be printed, for example with an item of information that is dependent on the weight value. Each labeler comprises a label receptacle for receiving a label roll comprising a plurality of labels. The label rolls are paper labels that are attached to a base paper and pre-cut, decorative labels, transparent labels, or a roll comprising linerless labels, i.e. continuous strips of labels without a carrier strip. Furthermore, a labeler comprises a measuring unit for determining the remaining labels on the label roll. The measuring unit comprises, for example, a sensor unit that provides information regarding a rotational speed of the printing roller, and a sensor unit that provides information regarding a rotational speed of the label roll or of the arbor of the label receptacle to which the label roll is attached. This information is evaluated in the measuring unit or in a control apparatus of the labeler, of the labeling system or of the weighing and labeling conveyor.

In one embodiment, in transient operation the labeling system switches the operating state of two labelers. The labeler that is in a passive operating state prior to the transient operation is in an active operating state after the transient operation. One of the labelers that are in an active operating state prior to the transient operation is in a passive operating state after the transient operation. After the transient operation, one labeler is again in standby mode (passive operating state), but this is a different labeler from that prior to the transient operation. The transient operation only lasts until the operating states of the labelers have been changed. That is to say that, in one embodiment, the labeling system is in transient operation for just a few milliseconds. The transient operation does not slow the frequency with which the labeling system labels.

In one embodiment, the weighing and labeling conveyor comprises a control apparatus. The control apparatus assigns two labelers an active operating state and one labeler a passive operating state. Which labelers are placed in which operating state is dependent on the label supply on the label rolls and on the operating states of the individual labelers in the past. The operating states are assigned according to one or more control schemata that are stored in the control apparatus. The control apparatus transfers the labeling system from normal operation to transient operation in order to change the operating states of at least one labeler.

In one embodiment, the control apparatus comprises a label supply calculation unit. The label supply calculation unit calculates, for each labeler, the relationship of the number of rotations of the printing roller of the labeler to the number of rotations of the label roll. In this case, the number of rotations also includes fractions of rotations. The rotational speed of the printing roller is proportional to the printed label length. If said label length is unrolled from the label roll, a radius of the outer label layer on the label roll is determined from the number of rotations of the label roll, which is in practice usually a fraction of a rotation. The label supply that is still available on the label roll is thus determined from this information. The control apparatus comprises a comparison unit that compares the calculated label supplies of the labelers of the labeling system with one another, taking account of at least one comparison threshold, and/or compares the calculated label supplies with a lower limit value. The comparison unit provides the underlying information for initiating the transient operation.

In one embodiment, a labeler switches to a fault state when the label supply of the labeler has been exhausted. In one embodiment, the control apparatus controls the active and passive operating states of the labelers of the labeling system such that one labeler is in the fault state for the maximum amount of time, provided that the other two labelers do not switch to the fault state. This is advantageous in that an operator has the maximum amount of time to change the label rolls in one labeler before the label supply of a second labeler has been used up. In one embodiment, the control apparatus controls the active and passive operating states of the labelers of the labeling system such that the maximum number of labels of the labeling system is applied before a second labeler switches to the fault state. This is advantageous in that the maximum number of labels can be applied without inserting a new label roll, articles in the article stream at the same time always being labeled alternately by two labelers. In one embodiment, the control apparatus controls the active and passive operating states of the labeler of the labeling system such that, after a first labeler switches to the fault state, a second labeler switches to the fault state after a delay of a defined changeover time. This is advantageous in that the length of time an operator requires in order to change a label roll of a labeler is taken into account. The changeover time is defined as the time required by said operator to make said change, optionally extended by a safety margin. The operator can change the label roll in this time. Following this, a second label roll is to be changed. In this respect, an operator is called to change the label roll when said operator can immediately change the label rolls in two rollers in succession. This increases the efficiency of the labeling system.

In one embodiment, the weighing and labeling conveyor comprises further labelers. These labelers that are not part of the labeling system consisting of three labelers apply further labels to an article, but not to the first application point of the article. For example, the further labelers may be bottom labelers if the three labelers of the labeling system are top labelers. For example, the further labelers may be top labelers if the three labelers of the labeling system are bottom labelers. If the three labelers of the labeling system are top labelers, the further labelers can also be top labelers that attach a label to a point on the top of the article that is different from the first application point.

A method according to the invention is suitable for operating a labeling conveyor comprising a transport apparatus and a labeling system that comprises three labelers. Each labeler comprises a printer, an applicator, a receiving apparatus for label rolls, and a measuring unit for determining the remaining labels on the label roll. The method comprises a step of providing information about the label supply of each labeler of the labeling system. This step is carried out once at the start of the method, or at regular intervals. According to the method according to the invention, articles are labeled, the articles comprising a first application point at the same point on the articles. A first labeler that is in an active operating state and a second labeler that is in an active operating state alternately apply a label to the first application point of successive articles. In this case, the third labeler is in a passive operating state. The label supply at least of the active labelers is determined periodically. In one embodiment, said determination of the label supply is carried out by evaluating the rotation of the printing roller and the rotation of the label roll. In one embodiment, when the labels are used by the labeler, the current label supply of the labeler is calculated on the basis of the usage and the original label supply. The original label supply is definite, in particular when a complete label roll is inserted, and can be entered by the operator. The method calculates the relationship between the label supplies of the labelers and links said relationships. When a predetermined relationship of the label supplies of the labelers is reached, transient operation is initiated. In transient operation, the labeler that is in a passive operating state switches to an active operating state, and a labeler that is in an active operating state switches to a passive operating state. Which of the two labelers in an active operating state is switched to the passive operating state is determined on the basis of the label supplies of the two active labelers. Following transient operation, normal operation is initiated.

In one embodiment, the information regarding the label supply of each labeler of the labeling system is generated when the system starts up, in that each labeler prints a specified number of labels and the label supply is determined in the process. That is to say that the control apparatus puts all the labelers into the active operating states once, at short intervals, in order to determine the label supplies. In one embodiment, the operator enters the fill level of the label roll in the weighing and labeling conveyor after changing the label roll. This is expedient in particular when the user inserts a complete label roll. This is the usual case in practice.

In one embodiment, a lower limit value of the label supply being reached in at least one labeler is identified and a status message is emitted. The limit value of the label supply is reached, for example, when there is just a small number of labels still available or when the label roll is empty. The status message is, for example, an item of information that is relayed to the operator by email or SMS in order to signal to said user that the label roll needs to be changed now or soon. A status message is, for example, also an indicator light on the labeler transport apparatus, or a status message on the terminal or operator display of the labeler transport apparatus.

In one embodiment, transient operation is initiated when the label supply of a labeler in the active operating state has been used up, and in transient operation said labeler is switched to the passive operating state. This is advantageous in that a labeler of which the label supply has been used up is switched to the passive operating state and replaced by a labeler of which the label supply has not been used up. The articles can thus continue to be labeled by two active labelers, alternately, despite the end of the label roll being reached in one labeler.

In one embodiment, transient operation is initiated after a labeler has been loaded with a new label roll. The labelers having the largest and having the smallest label supply are switched to an active operating state and the labeler having the medium label supply is switched to the passive operating state. This is advantageous in that an operator who is changing the label roll has the maximum time in which to change the label roll. The labeler in which the label roll has been used up can be in the fault state for the maximum time without another of the two labelers switching to the fault state, i.e. without the label roll of a second labeler being used up.

In one embodiment, the predetermined relationship for initiating transient operation is reached as soon as the label supply of at least one of the labelers in the active operating state has reached only half the labels of a complete label roll. In one embodiment, transient operation is only initiated, however, if a delay time has also elapsed since the last transition. This prevents transient operation from being initiated twice in succession when there are two complete label rolls that empty in parallel and reach half the labels of a complete label roll shortly after one another. This method, too, maximizes the time that an operator has for exchanging the label roll.

In one embodiment, if the label supplies on the label rolls of the labelers differ at the start, the labeler having the smallest label supply is put into the active operating state. If the second-smallest label supply is more than half a complete label roll, the labeler having the second-smallest label supply is put into the active operating state. If, instead, the second-smallest label supply is less than half a complete label roll, the labeler having the largest label supply is put into the active operating state. If the label supply of the labeler having the second-smallest label supply is smaller, by a first comparison threshold, than the label supply of the labeler having the largest label supply and is less than half a complete label roll, transient operation is initiated. The labeler having the second-smallest label supply is switched to a passive operating state. The two labelers having the largest label supply are alternately put into the active operating state, taking account of the comparison threshold, while at the same time the labeler having the smallest label supply remains in the active operating state. The labels in the labeler having the smallest label supply are thus used up first in order for said label roll to be changed before the other label rollers have also been used up. In this case, the comparison threshold ensures that the two labelers having the largest label supply are not alternately switched from the active to the passive operating state after every label.

In one embodiment, the two labelers having the largest label supply are put into the active operating state and the third labeler is put into the passive operating state. If the label supply of one labeler in the active operating state is smaller, by a second comparison threshold, than the label supply of the labeler in the passive operating state, transient operation is initiated and said labeler is switched to the passive operating state. This is advantageous in that the maximum number of labels of the labeling system is applied before a label roll needs to be changed by an operator.

In one embodiment, a changeover time for changing the label roll is provided. The changeover time is the maximum amount of time that a user normally needs in order to change the label roll, from notification to the completed label roll change. In one embodiment, said changeover time can also include a safety margin. A minimum label supply for the roll change is calculated on the basis of the changeover time for the operator and the printing speed of the labeler. The printing speed is the speed at which the labeler is actually printing at the time and is using the label material at the current article throughput. This is not necessarily the maximum printing speed of the labeler. The calculated minimum label supply is defined as the second comparison threshold. This is advantageous in that, after a first labeler switches to the fault state, a second labeler switches to the fault state after a delay of a defined changeover time. An operator is thus notified of when a label roll needs to be changed. If said operator has finished changing the label roll, he will soon have to change a second label roll. The operator thus only has to approach the labeling system once in order to change the label rolls of two labelers, without the labeling system coming to a standstill in the process.

In one embodiment, the described weighing and labeling conveyor implements a described method for operating a labeling conveyor.

FIG. 1 shows a weighing and labeling conveyor 10 according to the invention. The weighing and labeling conveyor 10 comprises a plurality of conveyor belts, in particular a weighing belt 34, one or more labeling belts 28, and at least one feed belt. A weighing and labeling conveyor 10 can in addition comprise a monitoring system 30, for example a metal detector or an optical monitoring system. The weighing and labeling conveyor 10 comprises a weighing unit, consisting of the weighing belt 34, that is connected to a weighing cell 32 in order to determine the weight of an article 38, for example a tray containing food or another article, that is intended to be weighed and labeled. The weighing belt 34 moves the article 38 in the conveying direction 40. The weighing and labeling conveyor 10 further comprises a labeling system 12 that consists of three labelers 14. A labeler 14 comprises a label receptacle 20 for receiving a label roll 18, a printer 22 that comprises a printing roller 24 and is intended for printing a label, and an applicator 16 for applying the label to a first application point 42 on an article 38. Each labeler 14 comprises an operating and control apparatus 26. The weighing and labeling conveyor 10 comprises a terminal 36 comprising a control apparatus. The weight determined for an article 38 using the weighing unit is printed on a label by one of the labelers 14 of the labeling system 12 and applied to the first application point 42 on the article 38. According to the invention, at a point in time, in each case one labeler 14 of the labeling system 12 is in a passive operating state (standby) and two labelers 14 of the labeling system 12 are in an active operating state. The labelers 14 that are in the active operating state label a stream of articles 38 that is transported across the labeling belt 28. In this case, the labels are attached to a first application point 42 on the articles 38, the first application point 42 on an article 38 always being at the same point, irrespective of the labeler 14 of the labeling system 12 by which the label is applied. The weighing and labeling conveyor 10 can comprise further labelers that are not part of the labeling system 12. For example, the weighing and labeling conveyor 10 may comprise a labeling system 12 having three top labelers 14, as shown in FIG. 1, and in addition comprise one or more bottom labelers that attach a label to the bottom of an article 38. Furthermore, the weighing and labeling conveyor 10 can comprise further top labelers that are not part of the labeling system 12 and that attach labels to a point on the article 38 that is different from the first application point 42. In one embodiment, the labeling conveyor does not comprise a weighing unit. In this case, the labeling system 12 does not print any article-dependent weight value, but instead an item of information that can be the same for all the articles 38, for example a sell-by date, or an article-specific item of information, for example a serial number.

Figure 2:
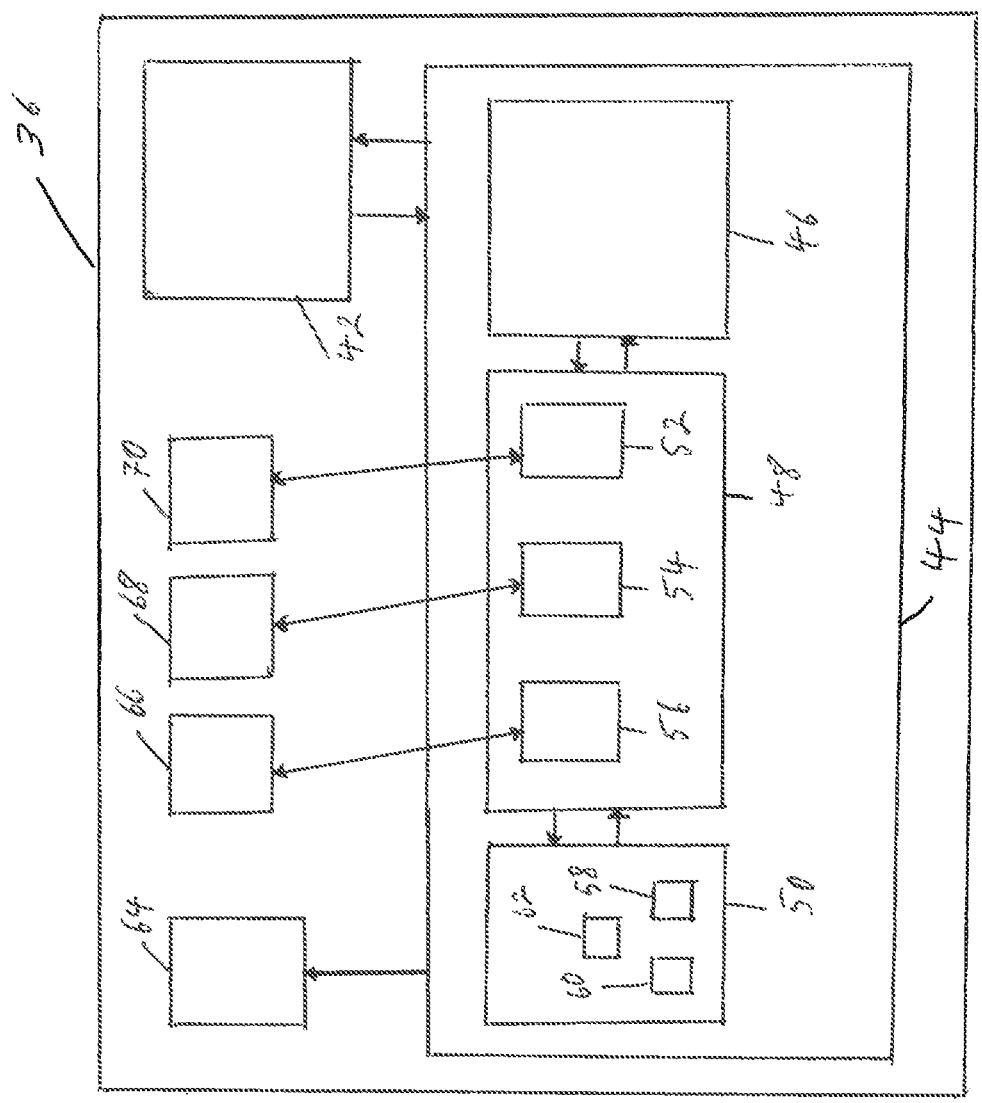
FIG. 2 is a block diagram for a terminal for a weighing and labeling conveyor according to the invention.

FIG. 2 schematically shows a terminal 36 of weighing and labeling conveyor 10. The functional blocks shown in the terminal 36 can be outsourced, completely or in part, to other units of the weighing and labeling conveyor 10; for example, functional blocks can be arranged in the weighing unit or in the labeling system. For example, a labeler 14 of the labeling system 12 can also be a master labeler that implements the function of functional blocks of the terminal. In this respect, FIG. 2 is a purely schematic representation. The terminal comprises a display 42 for providing the operator with information, which display is designed, for example, as an LCD display or as touchscreen display, and thus also functions as an input device. The terminal 36 comprises a control apparatus 44. The control apparatus comprises a weighing control apparatus 46 for controlling the weighing unit comprising the weighing belt 34 and for evaluating the weight information from the weighing cell 32. The control apparatus 44 comprises a labeling system control apparatus 48 comprising labeler control apparatuses 52, 54, 56 which are each assigned to one labeler 14 of the labeling system 12. The control apparatus 44 comprises a comparison unit 50 in which a first threshold value 58, a second threshold value 60 and a lower limit value 62 are stored. The comparison unit 50 compares the label supplies of the labelers with the first threshold value 58, with the second threshold value 60 and/or with the lower limit value 62, and returns this information to the labeling system control apparatus 48.

During normal operation, the labeling system control apparatus 48 assigns one labeler 14 a passive operating state and two labelers 14 an active operating state. The labeler 14 in the passive operating state is in standby. The labelers 14 in the active operating state label the articles 38 alternately. The labeler control apparatuses 52, 54, 56 are each connected to the operating and control apparatuses 26 of the labelers 14 by one interface 66, 68, 70. Via said interface, the labeler control apparatuses 52, 54, 56 control the labelers 14 and receive status messages from the labelers, for example the current label supply or whether the labeler 14 is in a fault state because the label supply has been used up. This information is generated by the operating and control apparatus 26 of the labelers 14. The control apparatus 44 emits a status message when a lower limit value 62 of the label supply is reached in at least one labeler. The status message is relayed to the operator by a signaling unit 64, for example via email or SMS, in order to signal to said operator that the label roll needs to be changed now or at least soon. A status message is, for example, also an indicator light on the labeler transport apparatus, or a status message on the operator display 42 of the labeler transport apparatus. The lower limit value 62 of the label supply is reached, for example, when there is just a small number of labels still available or when the label roll is empty.

Figure 3:
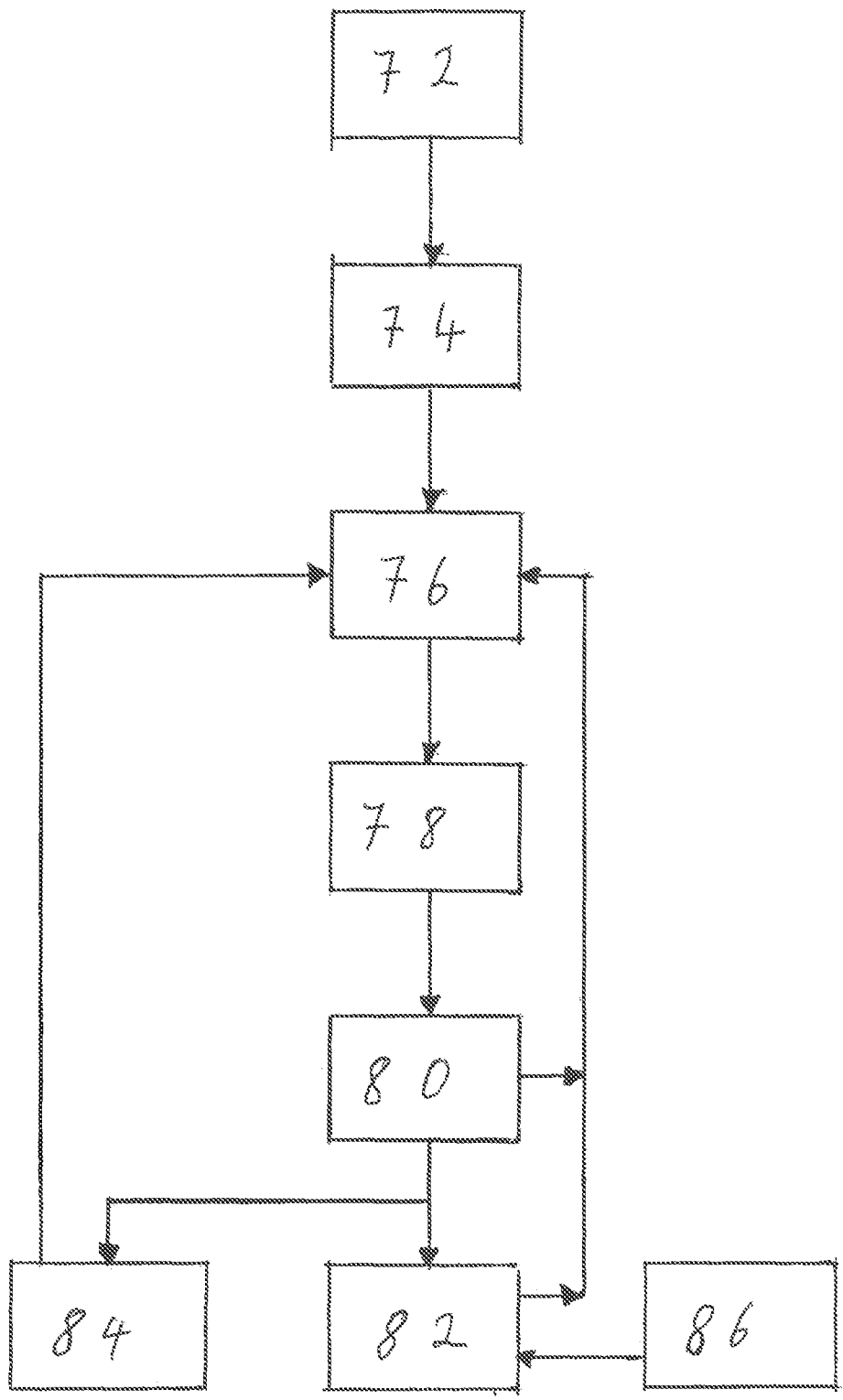
FIG. 3 shows a method according to the invention for operating a labeling conveyor.

FIG. 3 illustrates, by means of a flow diagram, the method for operating a weighing and labeling conveyor 10. In this case, only essential steps of the method are shown, for which modifications are described depending on the embodiment. Moreover, the description only addresses method steps that are required for selecting the labelers 14 from the labeling system 12, without going into details of how the weighing, printing and application are implemented. A person skilled in the art knows how this is implemented. A method for operating a labeling conveyor 10 determines, in step 72, the label supply of each labeler 14 of the labeling system 12. This information can be entered by an operator or can be stored, for example from the last operation of the weighing and labeling conveyor 10. Alternatively, the label supply can also be determined in that a number of articles 38 is labeled by each labeler 14, i.e. in that each labeler 14 is placed in the active operating state for a number of articles 38 and the label supply is calculated in the process.

In order to determine the label supply in a labeler 14, an item of information regarding the number of rotations of the printing roller 24 of the labeler 14 is related to the number of rotations of the label receptacle 20 and thus of the label roll 18. A length of the printed label can be derived from the number of rotations of the printing roller 24. The diameter of the label roll 18 can be derived from the number of rotations of the label roll 18 made for this label length. The label supply can be derived from the diameter of the label roll 18. A person skilled in the art would understand the number of rotations of the printing roller 24 and of the label roll 18 as a rational number, and therefore fractions of rotations are also taken into account. For example, as a rule, the printing roller rotates a plurality of times in order to print a label, the label roll 18 and thus the label receptacle 20 rotating only a fraction of a rotation on account of the size of the label roll 18. Since the labeler 14 contains a resilient guide unit for the labels between the label roll 18 and the printer 22, in order to precisely determine the label supply, preferably a plurality of labels is printed and a mean value is formed from the above-mentioned relationship. This information is evaluated in a measuring unit in order to determine the label supply of a labeler. In this case, the measuring unit is located in the operating and control apparatus 26 of a labeler 14.

The method for operating a labeling conveyor can be carried out using various types of labels. Thus, the label roll may, for example, contain linerless labels or paper labels comprising a carrier strip, or transparent labels, preferably comprising a carrier strip. The label rolls 18 that are loaded in the three labelers 14 of the labeling system 12 all contain the same labels. The weighing and labeling conveyor 10 can, however, comprise further labelers having different label types.

In step 74, the control apparatus 48 switches two labelers 14 into an active operating state and one labeler 14 into a passive operating state. In step 76, the articles 38 from the article stream are continuously labeled. In this case, the labelers 14 in the active operating state continuously apply a label to a first application point on each article. The first application point is at the same point on all the articles, optionally minus a tolerance that results from the labeling. In this case, the two labelers 14 in the active operating state label the articles 38 alternately, i.e. each labeler 14 labels every second article 38 in the article stream. In step 78, the label supply on the labelers 14 in the active operating state is periodically determined according to one of the methods described above, the label supply of the labeler 14 in the passive state still being known, since said labeler has not used any labels. In step 10, the label supplies of the three labelers 14 are related to one another by the comparison unit 50. When a specified relationship of the label supplies of the labelers 14 is reached, the labeling conveyor 10 is transferred, in step 82, from normal operation to transient operation, in which one labeler 14 in the active operating state is transferred to the passive operating state and the labeler 14 in the passive operating state is transferred to the active operating state. The selection of the labeler 14 that is transferred from the active operating state to the passive operating state is described in the following. Once the labeling conveyor is in normal operation, step 76 is carried out again and the articles 38 are labeled. If the comparison unit 50 identifies, in step 80, that the label supply of a labeler 14 has reached the lower limit value, a status message is emitted in step 84, by means of the signaling unit 64, in order to signal to the operator that at least one label roll needs to be changed. Step 76 is then carried out, and said labeler 14 will continue to label until the label supply thereof has been exhausted. If the comparison unit 50 identifies, in step 80, that the specified relationship of the label supplies of the labelers 14 has not been reached, the method returns to step 76.

In one embodiment, after the operator has inserted a new label roll into a labeler 14 in step 86, the labeling conveyor is also put into transition operation and then, in step 82, the labelers 14 are put into the associated active and passive operating states. In one embodiment, the labeler 14 in which a new label roll has been inserted is put into the active operating state. In one embodiment, the labeler 14 having the smallest label supply and the labeler 14 having the largest label supply are put into the active operating state. If a complete label roll has been inserted, in this embodiment, too, the labeler 14 in which a new label roll has been inserted is in the active operating state.

In one embodiment, the status message is emitted, in step 84, only when the label supply of a labeler 14 has been exhausted. Then, in step 82, said labeler 14 is put into the passive operating state and the labeler 14 that is in the passive operating state until then is put into the active operating state.

In one embodiment, in step 74 and in step 82, in each case the labeler 14 having the smallest label supply and the labeler having the largest label supply are put into the active operating state.

In one embodiment, the predetermined relationship is achieved, in step 80, if a labeler 14 in the active operating state has only half the labels of a complete label roll. In one embodiment, the predetermined relationship is only achieved, however, if a delay time has also elapsed since the last transient operation.

In one embodiment, in step 74, the labeler 14 having the smallest label supply is put into the active operating state. If the label supply of the labeler 14 having the second-smallest label supply is more than half the labels of a complete label roll, said labeler is put into the active operating state. If, instead, the label supply of the labeler 14 having the second-smallest label supply is less than half the labels of a complete label roll, the labeler having the largest label supply is put into the active operating state. The predetermined relationship in step 80 for initiating transient operation is reached if the label supply of the labeler having the second-smallest label supply is smaller, by a first comparison threshold, than the label supply of the labeler having the largest label supply and is less than half a complete label roll. In step 80, the labeler having the second-smallest label supply is switched to the passive operating state. In this case, the first comparison threshold is a parameter for adjusting the labeling system 12.

In one embodiment, in step 74, one of the two labelers 14 having the largest label supply is put into the active operating state, and the labeler having the smallest label supply is also put into the active operating state. The predetermined relationship in step 80 is then reached if the label supply of one of the labelers 14 in the active operating state is smaller, by a second comparison threshold, than the label supply of the labeler in the passive operating state. In this case, this criterion is fulfilled only if the label supply at time t of one of the labelers 14 in the active operating state is not yet smaller by a second comparison threshold and, at time t+delta-t the label supply of said labeler 14 is smaller by said second comparison value, t+delta-t being located temporally shortly after the time t. Said labeler 14 is switched to the passive operating state.

In one embodiment, an item of information regarding the changeover time for the operator for changing the label roll is provided. The changeover time consists of the time that the operator requires, on average, for this task, and also includes the time that said operator requires in order to provide a new label roll, for example by fetching said roll from the storeroom. Moreover, said changeover time includes a definable safety period in case the operator does not manage to change the label in the average change time proposed therefor. The comparison unit calculates therefrom the number of labels that the printer uses after the operator has been informed that a label roll needs to be changed until the time at which said operator has actually implemented the label roll change. Said minimal label supply is defined as the second comparison threshold. In this method, after the label supply of one labeler 14 has been exhausted, the label supply of a second labeler is exhausted following this changeover time for the operator. The operator can thus change two label rolls in immediate succession.

The functions of different elements shown in the drawings, including the functional blocks, can be implemented by dedicated hardware or by generic hardware, capable of implementing software, in conjunction with the corresponding software. If the functions are provided by means of a processor, said functions can be provided by a single dedicated processor, a single shared processor, or a plurality of generic processors, which may in turn be shared. The functions can, without restriction, be provided by a digital signal processor (DSP), network processor, application specific integrated circuit (ASIC), field programmable gate array (FPGA), read only memory (ROM) comprising stored software, random access memory (RAM), and non-volatile memory.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A weighing and labeling conveyor for labeling articles, the articles comprising a first application point at a same point on the article, the conveyor comprising:
    a weighing unit configured to determine the weight of the articles;
    a transport apparatus configured to transport the articles, the transport apparatus comprising at least one conveyor belt;
    a labeling system configured to label the articles, the labeling system having three labelers, each labeler having a respective supply of labels and comprising an applicator, each applicator being configured to apply a label from the respective supply of labels to the first application point on an article while the article is being transported on the transport apparatus; and
    a control apparatus,
    wherein, of the three labelers, during normal operation two labelers are in an active operating state and one labeler is in a passive operating state,
    wherein, during normal operation, the two labelers that are in the active operating state are configured to alternately label the first application point of successive articles such that a first of the two labelers that are in the active operating state is configured to label odd articles and a second of the two labelers that are in the active operating state is configured to label even articles, and
    wherein, the control apparatus is configured to monitor the respective supplies of labels for each labeler in the active operating state and to indicate when a quantity of one of the supplies of labels falls below a threshold value.

2. The weighing and labeling conveyor according to claim 1, wherein each labeler of the labeling system comprises a printer configured to print the labels, a label receptacle configured to receive a label roll comprising a plurality of labels, and a measuring unit configured to determining the remaining labels on the label roll.

3. The weighing and labeling conveyor according to claim 1, wherein, in transient operation, the operating state of two labelers of the labeling system is switched, the labeler that is in a passive operating state prior to the transient operation being in an active operating state after the transient operation, and one of the labelers that are in an active operating state prior to the transient operation being in a passive operating state after the transient operation.

4. The weighing and labeling conveyor according to claim 1, wherein the control apparatus is configured to assign two labelers the active operating state and one labeler the passive operating state, depending on the supply of the label rolls, the control apparatus being configured to transfer the labeling system from normal operation to transient operation to change the operating states of at least one labeler.

5. The weighing and labeling conveyor according to claim 4, wherein the control apparatus comprises a label supply calculation unit configured to calculate, for each labeler, the label supply of the labeler from a relationship of the rotations of a printing roller of the labeler to the rotations of the label roll, and in that the control apparatus comprises a comparison unit configured to compare the calculated label supplies of the labelers of the labeling system with one another, taking account of at least one comparison threshold, and/or configured to compare the calculated label supplies with a lower limit value.

6. The weighing and labeling conveyor according to claim 4, wherein a labeler is configured to switch to a fault state when the label supply of the labeler has been exhausted, and wherein the control apparatus is configured to control the active and passive operating states of the labelers of the labeling system such that
    one labeler is in the fault state for a maximum amount of time, provided that the other two labelers do not switch to the fault state, or that
    the maximum number of labels of the labeling system is applied before a second labeler switches to the fault state, or that, after a first labeler switches to the fault state, a second labeler switches to the fault state after a delay of a defined changeover time.

7. The weighing and labeling conveyor according to claim 1, wherein the weighing and labeling conveyor comprises further labelers that are not part of the labeling system consisting of three labelers, the further labelers configured to apply labels to an article, but not to the first application point of an article.

8. A method for operating a labeling conveyor comprising a transport apparatus that comprises at least one conveyor belt and a labeling system that has three labelers, each labeler comprising a printer, an applicator, a receiving apparatus for label rolls, and a measuring unit for determining the remaining labels on the label roll, wherein the method comprises the following steps:
provide an item of information about the label supply of each labeler of the labeling system;
conveying articles on the at least one conveyor;
labeling the articles while the articles are being transported on the conveyor, the articles comprising a first application point at the same point on the articles, a first labeler that is in an active operating state and a second labeler that is in an active operating state alternately applying a label to the first application point of successive articles such that the first labeler that is in the active operating state labels odd articles and the second labeler that is in the active operating state labels even articles, and the third labeler being in a passive operating state;
periodically determining the label supply at least of the active labelers;
initiating transient operation when a predetermined relationship of the label supplies of the labelers is reached; and,
in transient operation, switching the third labeler to an active operating state, and switching one of the first and second labelers to a passive operating state, and initiating normal operation.

9. The method according to claim 8, wherein the method further comprises the following steps:
identifying that a lower limit value of the label supply has been reached in at least one labeler; and
emitting a first status message.

10. The method according to claim 8, wherein transient operation is initiated when the label supply of a labeler in the active operating state has been used up, and wherein, in transient operation, said labeler is switched to the passive operating state.

11. The method according to claim 8, wherein transient operation is initiated after the labeler has been loaded with a new label roll, the labelers having the largest and having the smallest label supply being switched to an active operating state, and the labeler having the medium label supply being switched to the passive operating state.

12. The method according to claim 8, wherein transient operation is initiated as soon as the label supply of at least one of the labelers in the active operating state has reached only half the labels of a complete label roll.

13. The method according to claim 8, wherein, if the label supplies on the label rolls of the labelers differ at the start:
the labeler having the smallest label supply is put into the active operating state;
the labeler having the second-smallest label supply is put into the active operating state if the second-smallest label supply is more than half a complete label roll;
the labeler having the largest label supply is put into the active operating state if the second-smallest label supply is less than half a complete label roll; and
initiating transient operation if the label supply of the labeler having the second-smallest label supply is smaller, by a first comparison threshold, than the label supply of the labeler having the largest label supply and is less than half a complete label roll, and switching the labeler having the second-smallest label supply to a passive operating state.

14. The method according to claim 8, wherein the method further comprises the following steps:
putting the two labelers having the largest label supply into the active operating state and putting the third labeler into the passive operating state; and
initiating transient operation if the label supply of one labeler in the active operating state is smaller, by a second comparison threshold, than the label supply of the labeler in the passive operating state, and switching said labeler to the passive operating state.

15. The method according to claim 14, wherein the method further comprises the following steps:
providing an item of information regarding a changeover time for changing the label roll;
calculating a minimum label supply for the roll change on the basis of the changeover time and the printing speed; and
defining the calculated minimal label supply as the second comparison threshold.

16. The method according to claim 12, wherein transient operation is initiated if a delay time has also elapsed since the last transient operation.

* * * * *